Figure 1:
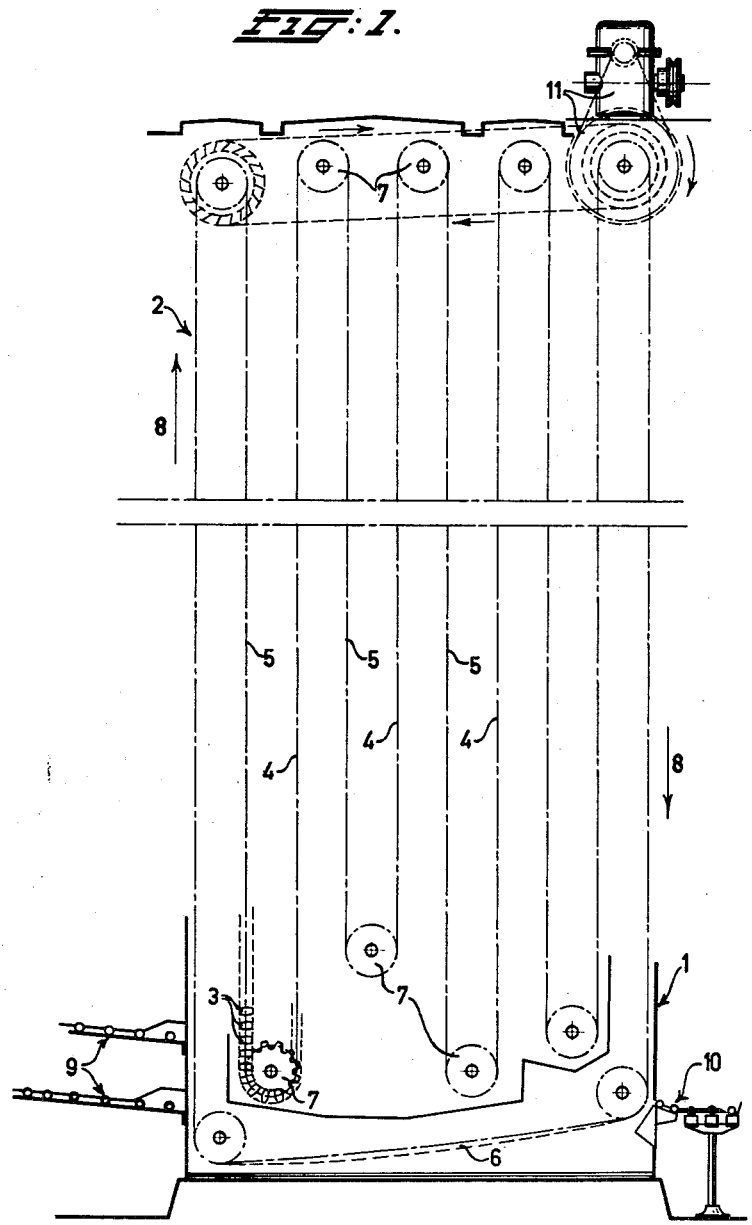

Dec. 29, 1964 J. B. VAN DER WINDEN 3,163,284
ARTICLE SUPPORT FOR CONVEYOR
Filed Aug. 23, 1962 2 Sheets-Sheet 1

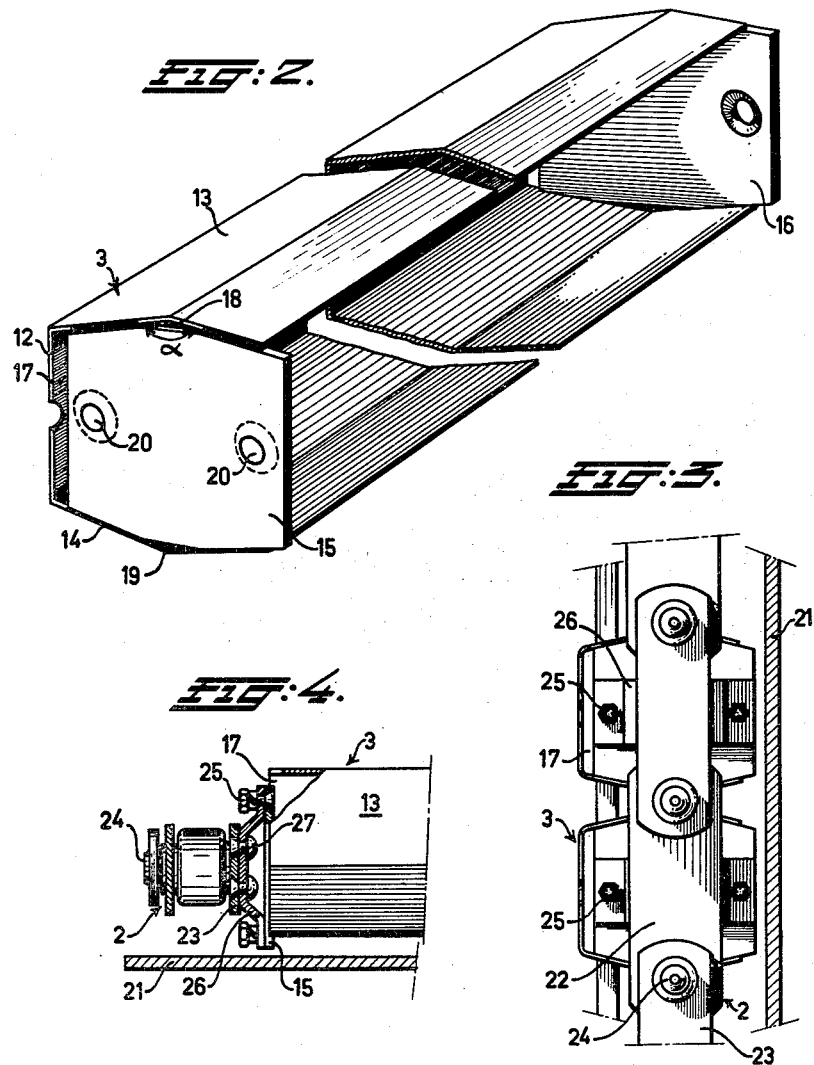

United States Patent Office 3,163,284
Patented Dec. 29, 1964

3,163,284
ARTICLE SUPPORT FOR CONVEYOR
Johannes Bernardus van der Winden, Amstelveen, Netherlands, assignor to Gebr. Stork & Co's Apparatenfabriek N.V., Amsterdam, Netherlands, a limited-liability company of the Netherlands
Filed Aug. 23, 1962, Ser. No. 219,009
Claims priority, application Netherlands, Aug. 23, 1961, 268,526
11 Claims. (Cl. 198—152)

My invention relates to a device for treatment of tinned commodities, as for instance a device for the sterilisation of preserves, which device comprises a conveyor, in the form of an endless belt or chain, which is provided with supports for the tins, the said conveyor substantially passing through upwardly and downwardly extending sections of a track. In most cases tube shaped supports are provided which either have a substantially circular or rectanguluar cross section.

By the use of such supports the folded edges and the printed inscriptions on the outer side of the tins are subject to damage due to the fact that on treatment of the tins in the installation there may be produced a temporary bulging of the walls of the tin, the bulging parts of the tin coming into contact either with the wall of the support or with an adjacent tin. The damage caused is also a consequence of the movements to which the supports filled with tins are subjected during their passage through the installation.

It is a first object of my invention to obviate these disadvantages by using gully shaped support so that the tins will substantially rest on four points of support, constituted by the two folded edges of the tin. As these points of support are situated remote from the center of the tin as contemplated both in the transverse direction and in the longitudinal direction of the tin, the central and farthest bulging out portion of the tin will have such a spacing with respect to the walls of the gully shaped bearer that there is no possibility of contact and consequently no damage will occur.

My invention has as a further object preventing as much rolling as possible of the tins to and fro during the passage of the filled conveyor through the installation.

A still further object of my invention is to shape the supports such, that they are capable of being filled from the long front side which is desirable when the supports are of considerable length and ten or twenty tins at a time can be fed thereto.

A still further object of my invention is to avoid that the tins in the supports will exert a couple upon the conveyor which tends to tip the conveyor.

My invention also contemplates providing a very compact structure for the conveyor consisting of two chains with a series of parallel supports therebetween.

During passage of the supports through the device a quantity of moisture (water in most cases) can get into the supports, and it is another object of my invention to shape the support such that in practically every position of the support any liquid, can flow out.

Yet another object of my invention is to make the supports suitable for the use of flat tins which are frequently used in the preserving industry.

My invention will hereinafter be described with reference to the drawing in which an embodiment of the device and of the support according to my invention is shown and wherein:

FIG. 1 shows diagrammatically a section of a device for treamtent of tinned commodities, FIG. 2 is a perspective view of a separate support of the device according to FIG. 1, FIG. 3 is a section to an enlarged scale of a small portion of the device according to FIG. 1, with a short part of the conveyor being illustrated, and FIG. 4 shows a detail of the attachment.

The device which is diagrammatically represented in FIG. 1 consists of a housing 1 in which is accommodated a conveyor 2, in the form of two parallel endless chains. These chains are provided with supports 3 for the tins. The conveyor 2 passes through substantially upwardly and downwardly directed track sections 4, 5, respectively and an end section 6 on the lower side of the installation. The chains of the conveyor are turned around wheels 7. The direction of movement of the conveyor is indicated by arrows 8. There is furthermore a station 9 for feeding tins to the device and also a station 10 for discharge. The conveyor is driven by means of the drive means 11.

As is visible in FIG. 2 each support 3 is constituted by a gully shaped element 12 with a U-shaped cross section. The side walls 13 and 14 of the elements are slightly convergent such that each side wall has a V-shaped cross section, enclosing an angle of about 150°. Welded to both ends of the gully shaped element 12 are end walls 15 and 16. These end walls have such a shape and position with respect to the side walls 13 and 14 that three passages are formed viz. a passage 17 in the proximity of the bottom wall of the support and a passage 18, 19, respectively at the location of the outermost zones of the side walls 13, 14, respectively. The end walls 15 and 16 are each provided with two apertures 20 for fastening purposes to be described hereinafter.

Represented in section in FIG. 3 is a wall 21 of the device to which the supports 3 are applied. This device is provided with a conveyor 2, in the form of a double chain. FIG. 3, shows an upwardly or downwardly directed track section of this conveyor 2. The conveyor 2 comprises links 22 and 23 which by pins 24 are hingedly connected with each other by way of pins 24. A support 3 is secured to each link by means of two bolts 25, the said bolts passing through apertures 20 in the end walls 15 and 16 of the supports. The attachment is such that each support 3 is fixedly connected with an adjacent link 22, 23, respectively of the conveyor 2. In the embodiment represented in the drawing there is a chain of the conveyor 2 on either side of the support. The position of each support with respect to the conveyor 2 such that the most outwardly situated area of the side walls 13 and 14 substantially coincides with the center line of the conveyor 2. Consequently when the supports are filled the conveyor 2 is substantially under tensile and no tilting couple is produced.

As is most clearly shown in FIG. 3 the cross section of the supports is in the shape of a very flat rhomboid wherein the corners of the rhomb are truncated. Due to the bulging shape of the bearers formed in this way there will be sufficient clearance available, during the movement of the conveyor 2 along a sprocket wheel 7 on the lower and upper side of the track sections, represented in FIG. 1 in order to permit the conveyor to be carried along the sprocket wheel with a radius of curvature which is not too great. The supports 3 are spaced in the central part of the conveyor with little clearance so that a compact arrangement of the supports in the conveyor is possible.

FIG. 4 shows the attachment of the supports 3 to the conveyor 2. The bolts 25 connect the end wall 15 (or 16) with a strip 26 which in a central bulging portion is attached by fasteners 27 to the links 22, 23 of the conveyor 2.

Having now fully described my invention, what I claim is:

1. A device for treatment of packaged products comprising conveyor means including an endless conveyor which is advanced along a track having parallel paths and wherein the conveyor advances in opposite directions in alternating paths, supports for said packaged products, said supports each comprising a pair of opposite side walls of V shape facing in opposite directions, said side walls defining included angles which are obtuse, said supports each further comprising a flat portion connecting said side walls together to define a substantially U-shape for the support, and means securing the supports to the conveyors for advancement therewith, with the side walls of the supports extending transversely with respect to the direction of advancement of the conveyor.

2. A device as claimed in claim 1 wherein the side walls of each support have apexes which face in opposite directions, said conveyor means having a central median plane in which said apexes are located.

3. A device as claimed in claim 1 wherein the conveyor is constituted by two chains which each include a plurality of links which are connected together, each support having opposite ends which are secured to a link of each respective chain such that there are substantially as many supports as there are links in each chain.

4. A device as claimed in claim 1 wherein said obtuse angles each include an angle of at least 135°.

5. A device as claimed in claim 2 wherein each support includes end walls connected to said side walls each end wall defining a passage with the bottom portion as well as passages with the side walls.

6. A device for the treatment of packaged commodities, said device comprising: conveyor means constituted by an endless conveyor advanced substantially along a track having upwardly and downwardly extending sections, said conveyor means further comprising a number of supports for the packaged commodities, said supports each being of U-shaped cross section with side walls extending transversely to the longitudinal direction of advancement of the conveyor, said side walls being slightly outwardly bulged in the direction of advancement of the conveyor with a maximum outward bulge in a central zone of the side walls.

7. A device for the treatment of packaged commodities, said device comprising: conveyor means constituted by an endless conveyor advanced substantially along a track having upwardly and downwardly extending sections, said conveyor means further comprising a number of supports for the packaged commodities, said supports each being of U-shaped cross section with side walls extending transversely to the longitudinal direction of advancement of the conveyor, said side walls being slightly outwardly bulged in the direction of advancement of the conveyor with a maximum outward bulge in a central zone of the side walls, said conveyor having a central median plane, said maximum outward bulges of the supports lying in the central median plane of the conveyor.

8. A device as claimed in claim 7 wherein each said support includes end walls, said supports each having an opening for the introduction and removal of the products to be treated lying in a plane extending parallel to the direction of advancement of the conveyor.

9. A support for packaged commodities, said support being adapted for advancement along a path in an enclosure in which the packaged commodities are treated, said support comprising: opposite side walls of V-shape facing one another, said side walls having included angles which are greater than 135°, a bottom wall connected to said side walls to define a substantially U-shaped cross section for the support, end walls for said support connected to the side walls and extending perpendicular to the bottom wall, said support having an opening facing the bottom wall and defined by the side walls and end walls which opening is substantially coextensive with the bottom wall and through which commodities to be treated may be introduced and withdrawn all at once, said commodities resting on the side walls of V-shape as the support is advanced along said path in the enclosure.

10. A device as claimed in claim 9 wherein the end walls are provided with apertures for securing the support to a conveyor.

11. A device as claimed in claim 10 wherein the end walls each define passages with the bottom wall as well as passages with the side walls in a region adjacent the apexes of the side walls.

References Cited by the Examiner
UNITED STATES PATENTS

| | | | |
|---|---|---|---|
| 304,241 | 8/84 | Shepard | 198—152 |
| 565,334 | 8/96 | Dodge | 198—152 |

SAMUEL F. COLEMAN, *Acting Primary Examiner*,

WILLIAM B. LABORDE, *Examiner*